United States Patent [19]
Underwood, III

[11] Patent Number: 5,836,351
[45] Date of Patent: Nov. 17, 1998

[54] VENT DEVICE

[76] Inventor: William D. Underwood, III, 3761 W. Monte Cristo, Phoenix, Ariz. 85023

[21] Appl. No.: 822,269

[22] Filed: Mar. 20, 1997

[51] Int. Cl.[6] ................................................. F16K 24/00
[52] U.S. Cl. ........................ 137/587; 137/588; 137/493.7; 137/493
[58] Field of Search ...................... 137/587, 588, 137/493.7, 493, 74, 79, 212, 511, 493.6, 493.4, 71, 493.9; 222/400.7, 481.5

[56] References Cited

U.S. PATENT DOCUMENTS

| | | | |
|---|---|---|---|
| 2,860,656 | 11/1958 | Eshbaugh | 137/587 |
| 3,603,343 | 9/1971 | Keller | 137/493.6 |
| 4,016,904 | 4/1977 | Gordon | 137/493.9 |
| 4,023,583 | 5/1977 | Parkinson . | |
| 4,091,837 | 5/1978 | Edmunds et al. | 137/493.7 |
| 4,133,346 | 1/1979 | Smith et al. . | |
| 4,266,574 | 5/1981 | Tilling | 137/587 |
| 4,458,711 | 7/1984 | Flider | 137/71 |
| 4,535,806 | 8/1985 | Ottung . | |
| 5,044,397 | 9/1991 | Szlaga et al. | 137/587 |

FOREIGN PATENT DOCUMENTS

| | | | |
|---|---|---|---|
| 1454344 | 11/1976 | United Kingdom | 137/588 |
| 2228311 | 8/1990 | United Kingdom | 137/587 |

*Primary Examiner*—Denise L. Ferensic
*Assistant Examiner*—John Ball
*Attorney, Agent, or Firm*—Parsons & Goltry; Robert A. Parsons; Michael W. Goltry

[57] ABSTRACT

A vent for conducting gas from the atmosphere to a space of a container, the vent comprising a manifold engagable to the container in gas communication and a breather intake assembly engagable to the manifold in gas communication and having a valve assembly operative for admitting ambient air into the container when subatmospheric pressure is present within the container.

32 Claims, 4 Drawing Sheets

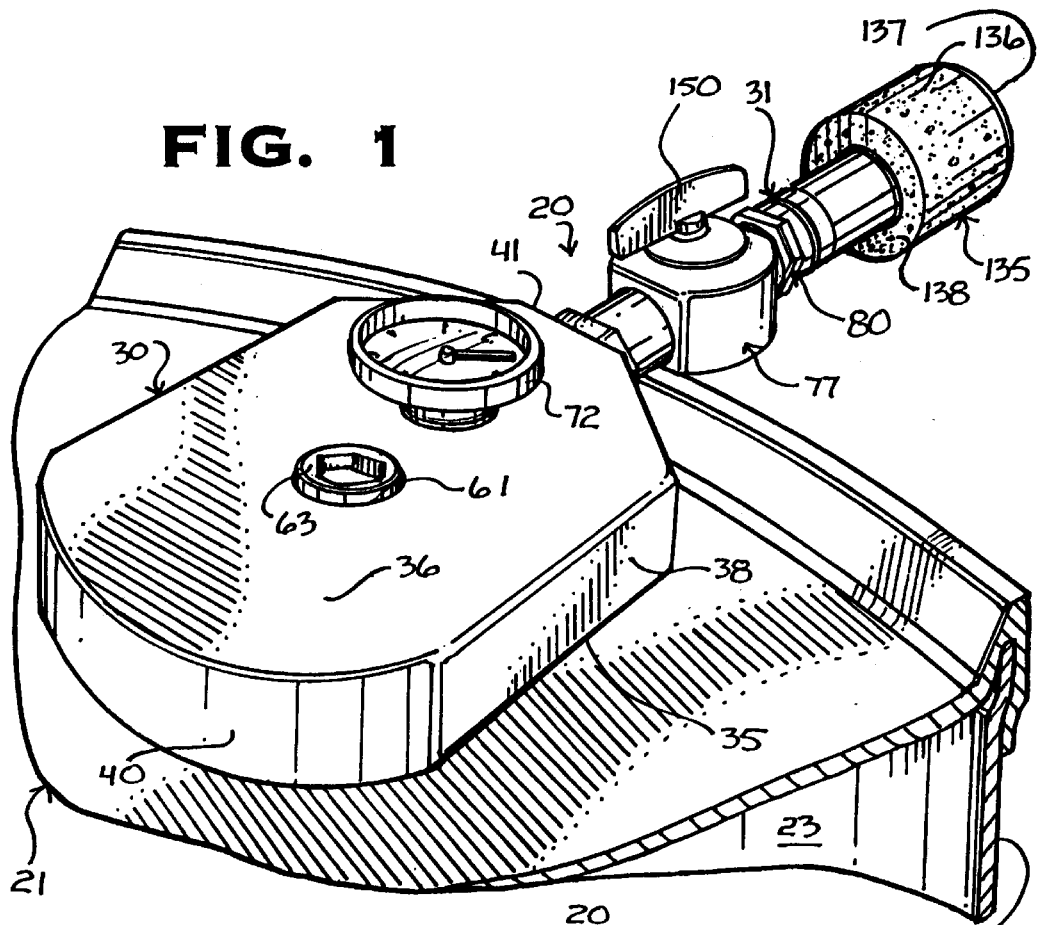

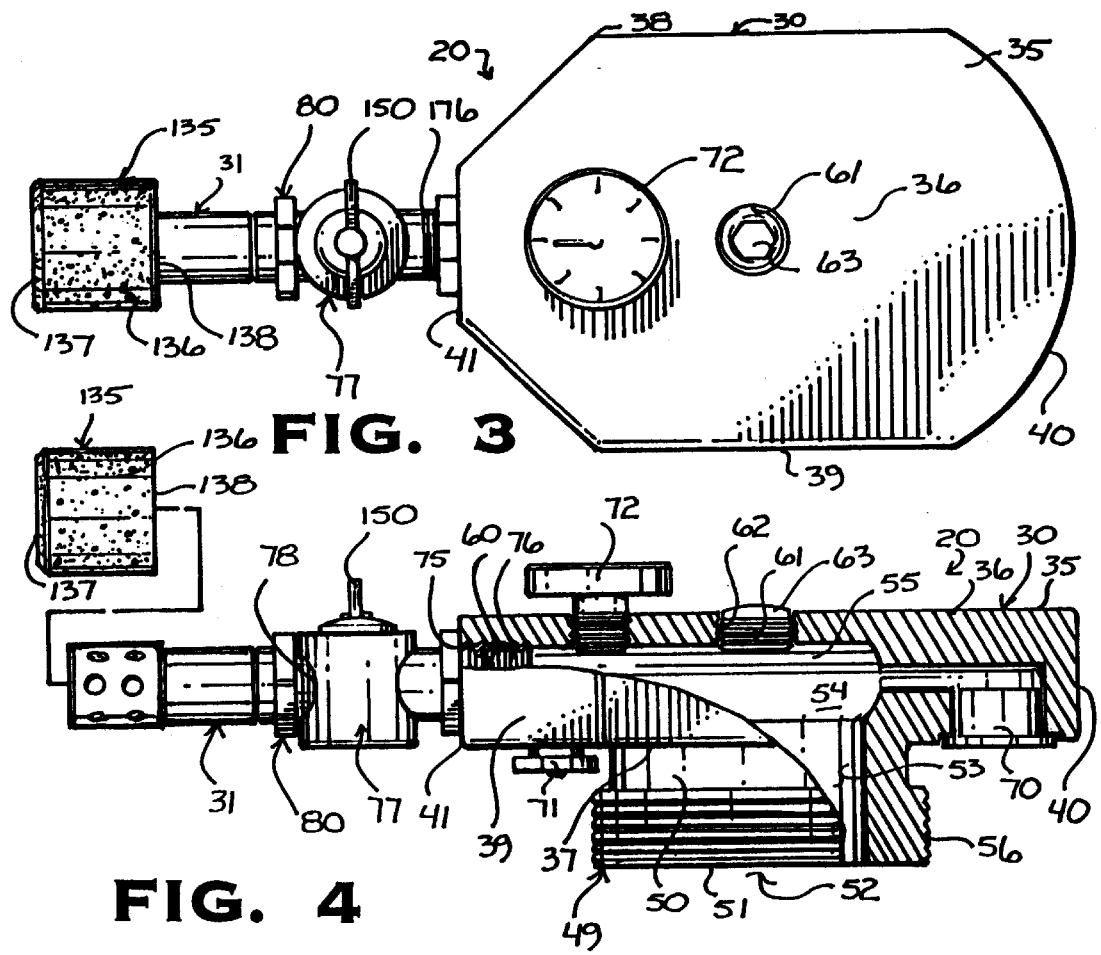
FIG. 3
FIG. 4
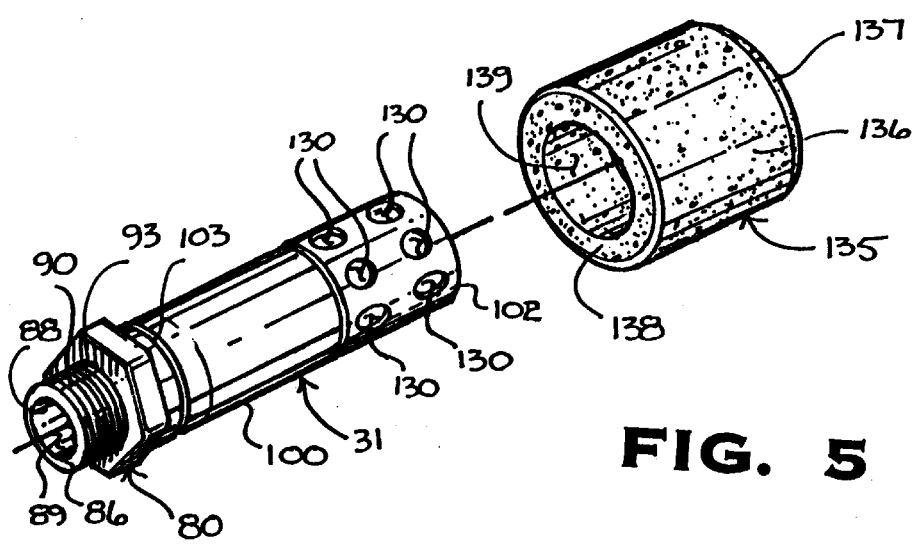
FIG. 5

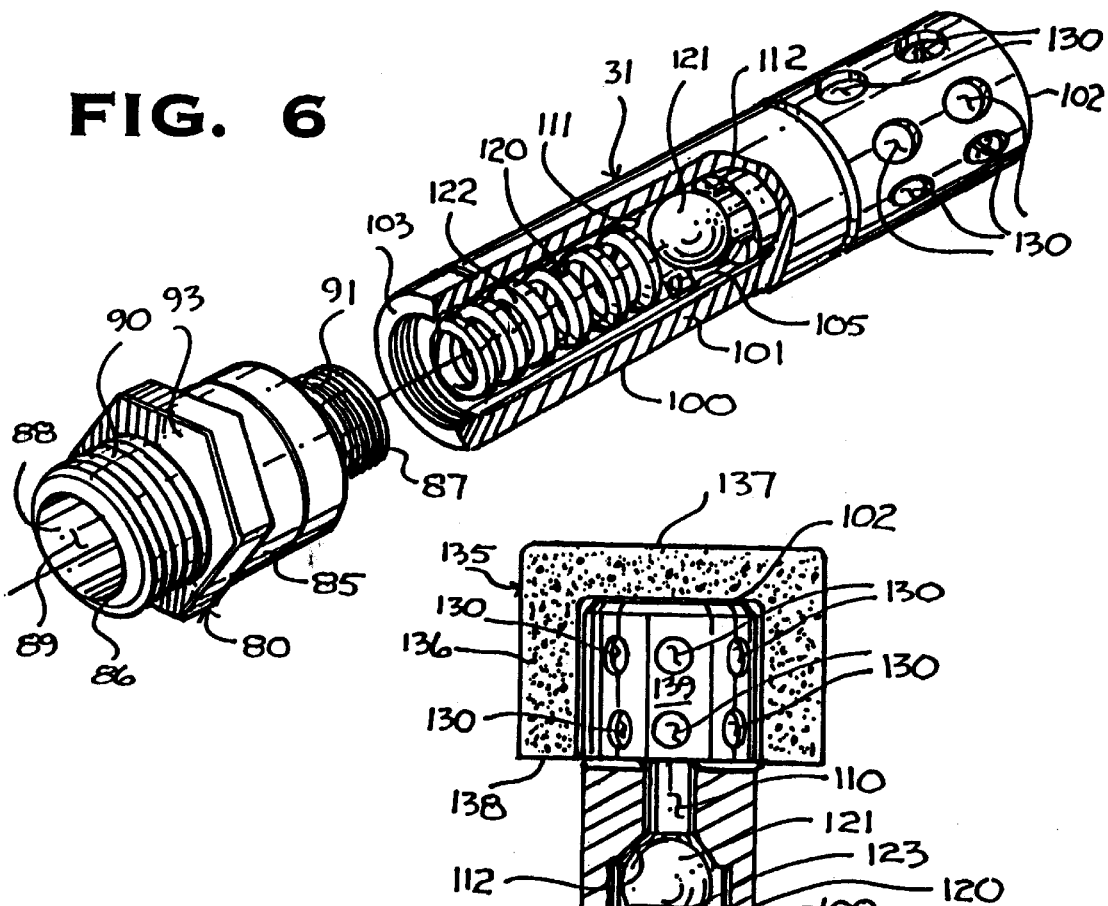

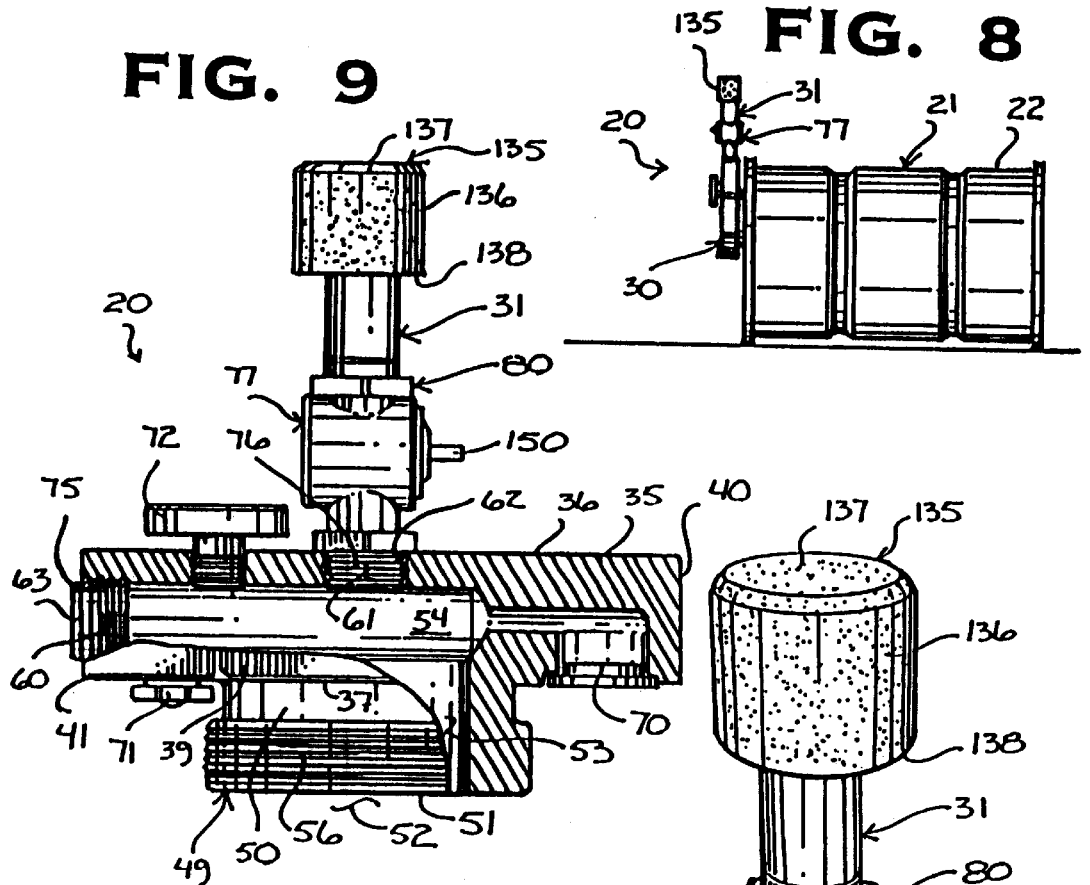
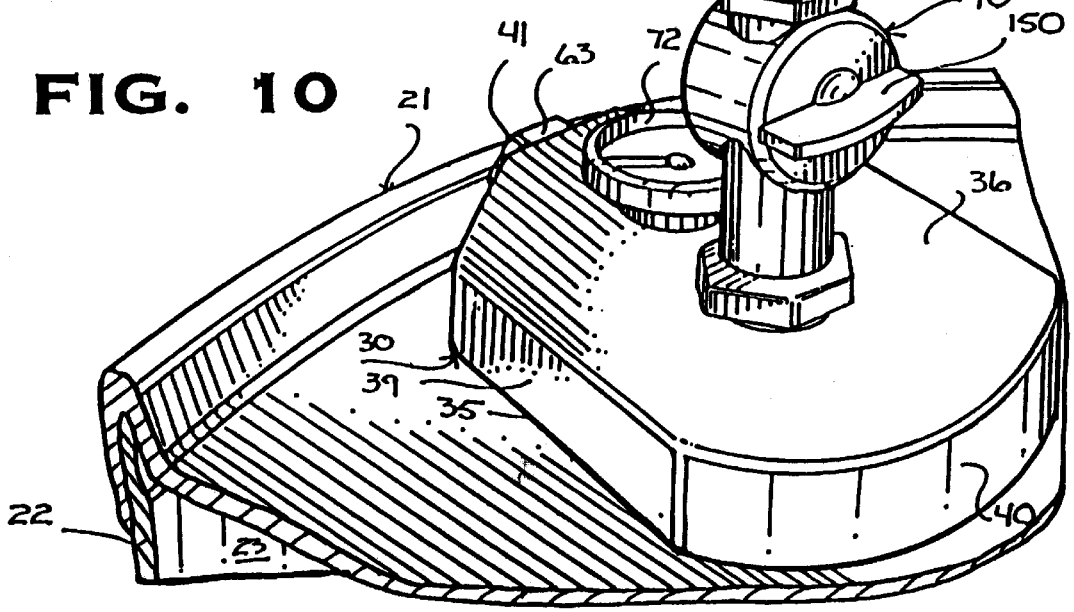

VENT DEVICE

BACKGROUND OF THE INVENTION

1. Field of the Invention

This invention relates generally to the field of vents.

More particularly, this invention relates to vents for admitting gas into a space.

In a further and more specific aspect, the instant invention relates to a vent especially adapted for use with containers having a shell bounding a space, the vent being operative for admitting gas into the space of the container when subatmospheric pressure is present within the space.

2. Prior Art

There are many varieties of containers operative for storing liquids. For instance, metal drums of various capacity are commonly used for storing and transporting various liquids. These drums normally include a shell bounding a space within which liquid may be contained. An end of the shell normally includes a pair of diagonally opposite, spaced-apart bungs. To facilitate dispensing of the liquid from the container, a faucet is normally connected to one of the bungs and a vent attached to the other. The vent is operative for allowing gas to admit from the atmosphere and into the space as the fluid is discharged through the faucet.

The prior art has provided a variety vents having various exemplary functional and structural attributes suitable for relieving vacuum and pressure buildup with drums of the foregoing type. However, it has been noticed through experimentation that certain functional shortcomings inherent in the prior art vents necessitate certain new and useful improvements operative for increasing the efficiency and usefulness thereof.

It would be highly advantageous, therefore, to remedy the foregoing and other deficiencies inherent in the prior art.

Accordingly, it is an object of the present invention to provide a new and improved vent for use in combination with a container of the type having a shell bounding a space and at least one bung for accessing the space, the vent being operative engagement to the bung for relieving vacuum and pressure buildup within the space.

Another object of the present invention is to provide a vent that is safe.

And another object of the present invention is to provide a vent that is easy to construct.

Still another object of the present invention is to provide a vent that is easy to use.

Yet another object of the instant invention is to provide a vent that is inexpensive.

Yet still another object of the instant invention is to provide a vent inhibits contaminants from entering the space of the container.

And a further object of the present invention is to provide a vent that may be used whether the bung is vertically or laterally disposed.

Still a further object of the immediate invention is the provision of inhibiting personal injury with a vent when the liquid carried within the container is toxic.

Yet a further object of the invention is to provide a vent that is versatile.

SUMMARY OF THE INVENTION

Briefly, to achieve the desired objects of the instant invention in accordance with a preferred embodiment thereof, provided is a vent for use in combination with a container of a type including a shell enclosing a space for storing a selected fluid and a bunghole formed through the shell to access the space, the vent being operative for conducting gas in the form of ambient air from the atmosphere to the space when the pressure within the space is subatmospheric.

Vent includes a manifold including an inlet, an outlet detachably engagable to the bunghole in gas communication, and a channel interconnecting the inlet and the outlet in gas communication. Further included is a breather intake assembly including an inlet element. The inlet element includes a continuous sidewall with an open inlet end, an open outlet end and a bore extending therethrough from the open inlet end to the open outlet end for facilitating the passage of gas from the open inlet end to the open outlet end. The bore includes a first bore section in gas communication with the open inlet end, a second bore section in gas communication with the first bore section and the open outlet end, and a seat located intermediate the first bore section and the second bore section. The breather intake assembly further includes a valve assembly carried by the second bore section including a plug positioned proximate the seat and biasing means for bearing the plug against the seat in normal sealing engagement for inhibiting gas from passing from the first bore section to the second bore section.

The present invention further includes connector means for interconnecting the open outlet end of the breather intake assembly to the inlet of the manifold in gas communication, the bias of the biasing means being overcome to release the plug from the seat to permit gas to admit thereby and into the second bore section, through the connector, the inlet, the channel and the outlet of the manifold for receipt into the space of the container when sub-atmospheric pressure is present within the space of the container.

In a particular embodiment, the present invention may further include a pressure-sensitive valve carried by the manifold in gas communication with the channel and directed toward the container, the burst valve being operative to release gas from the space when superatmospheric pressure is present within the space of the container. Superatmospheric pressure is generally defined herein as pressure greater than the atmospheric pressure, or the pressure external of container 21. Furthermore, subatmospheric pressure is generally defined herein as pressure less than the atmospheric pressure, or the pressure external of container 21.

In a further embodiment, the present invention may also include a filter carried by the open inlet end of the breather intake assembly and operative for filtering contaminants from the gas passing into the open inlet end of the breather intake assembly to inhibit contaminants from entering the space of the container.

In yet another embodiment, the present invention may still further include a temperature-sensitive valve carried by the manifold in gas communication with the channel and directed toward the container, the temperature-sensitive valve being operative to release gas from the space at a predetermined temperature.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 illustrates a vent for use in combination with a container of a type having a shell bounding a space for holding fluid, the vent including a manifold and a filter carried by a breather intake assembly mounted to the manifold in a first orientation and operative for relieving vacuum and pressure buildup within the space, in accordance with a preferred embodiment of the present invention;

FIG. 2 is fragmented perspective view of the vent of FIG. 1 showing the manifold having an outlet engagable to a bung of the container of FIG. 1 in fluid communication;

FIG. 3 is a top plan view of the vent of FIG. 1;

FIG. 4 is a side elevational view of the vent of FIG. 1 with portions thereof broken away for the purpose of illustration, and further showing the filter in exploded relation relative the breather intake assembly;

FIG. 5 is a perspective view of the breather intake assembly of the vent of FIG. 1 and coupled to a connector element operative for interconnecting the breather intake assembly to the manifold in fluid communication, with the filter shown in exploded relation;

FIG. 6 is a perspective view of the breather intake assembly of FIG. 5 with portions thereof broken away for the purpose of illustration, and further showing the connector element in exploded relation,;

FIG. 7 is a vertical sectional view of the breather intake assembly and the connector element as shown in FIG. 5, with the filter shown as it would appear carried by the breather intake assembly;

FIG. 8 is a side elevational view of the vent of FIG. 1 shown as it would appear coupled to the container;

FIG. 9 is a side elevational view of the vent of FIG. 1 with the breather intake assembly carried by the manifold in a second orientation, with portions of the manifold being broken away for the purposes of illustration; and FIG. 10 is perspective view of the vent illustrated in FIG. 9 and shown as it would appear coupled to the container of FIG. 1.

DETAILED DESCRIPTION OF THE PREFERRED EMBODIMENT

Turning now to the drawings, in which like reference characters indicate corresponding elements throughout the several views, attention is first directed to FIG. 1 which illustrates a preferred embodiment of the present invention comprising a vent being generally designated by the reference character 20. Consistent with the teachings of the present invention, vent 20 is operative in combination with a container 21 of a type having a shell 22 bounding a space 23 for holding fluid, whether toxic or non-toxic. Those skilled in the art normally refer to container 21 as a drum or barrel typically used for holding fluids for transport and perhaps for storage purposes, whether permanent or temporary. In this regard, shell 22 of container 21 is normally constructed of metal with one end of the shell 22 provided with a pair of diagonally opposite, spaced-apart bungholes.

Consistent with the foregoing, to facilitate dispensing of fluid from container 21, a faucet may be connected to one of the bungholes and a vent attached to the other bunghole. As fluid is dispensed from the faucet, the vent operates to admit air into container 21 from the atmosphere to displace the fluid as it is dispensed through the faucet. Furthermore, at any given time, the pressure within container 21 may be either at a subatmospheric level or a superatmospheric level. In this manner, a vent coupled to one of the bungholes may operate to admit air from the atmosphere into container 21 when the pressure within container 21 is subatmospheric, and expel gas from container 21 when the pressure within container 21 is superatmospheric. In accordance with the ensuing discussion, vent 20 is thus suitable for use in the foregoing manner.

As herein previously mentioned, container 21 is typical of known barrel or drum containers. Therefore, although the bungholes of container 21 and other structural features of container 21 have been disclosed in neither the drawings nor the present discussion, the foregoing and additional structural features of container 21 will readily occur to the skilled artisan. Thus, further details of container 21 will not be set forth except to the extent necessary to facilitate a clear and concise description of the preferred embodiment of the present invention.

Therefore, with continuing reference to FIG. 1, vent 20 is engagable to one of the bungholes of container 21 for facilitating fluid or gas communication between the atmosphere and space 23 defined by shell 22. Consistent with the teachings of the present invention, the terms fluid communication and gas communication are intended to be synonymous terms. In this regard, a fluid is intended to include a substance, whether a liquid or a gas, tending to flow or conform to the outline of its container. In this respect, not only does a liquid conform to the definition of fluid, but also a gas as a gas can flow and does conform to the outline of the container within which it may reside. Therefore, although the various aspects of vent 20 will be herein discussed as facilitating gas communication between the atmosphere and space 23 of container 21, the term gas communication is not intended to be limiting in this respect.

Regarding FIG. 1, vent 20 includes a manifold 30 engagable to a bunghole, and a breather intake assembly 31 engagable to manifold 30 in gas communication in a first orientation as shown in FIG. 1, and a second orientation as shown in FIG. 10, further details of which will be discussed as the detailed description ensues.

With continuing reference to FIG. 1, and additional reference to FIG. 2 and FIG. 3, manifold 30 includes, in relevant part, a body 35 including an upper surface 36, a lower surface 37, side surfaces 38 and 39, a rearward end 40 and a forward end 41. Preferably constructed of metal or other similar structure, manifold 30 further includes an outlet generally designated at 49 and defined as an annular sidewall 50 extending outwardly from lower surface 37 and terminating with an annular rim 51 defining an opening 52 communicating with a passageway 53 bound by annular sidewall 50. With attention directed specifically to FIG. 4, passageway 53 communicates with a chamber 54 defined by a continuous inner wall 55 of manifold 30. As shown in FIG. 2 and FIG. 3, annular sidewall 50 includes an outwardly threaded portion 56 operative for threadably and sealingly engaging one of the bungholes of container 21 upon rotation of manifold 30 in a predetermined and selected direction, with outlet 49 facilitating gas communication between space 23 of container 21 and chamber 54 of manifold 30.

Regarding FIG. 4, channel 54 of manifold 30 communicates and extends forwardly through body 35 toward forward end 41 and terminates with a first port or inlet 60 formed through forward end 41 of body 35. Manifold 30 also includes a second port or inlet 61 extending inwardly through upper surface 36 of body 35 in communication with channel 54. Inlet 61, shown in FIG. 1 and FIG. 3 as being preferably generally centrally disposed, extends vertically into channel 54 and is defined by a threaded inner wall 62 operative for threadably and detachably receiving a plug 63 upon rotation of plug 63 in a predetermined and selected direction for inhibiting gas from communicating outwardly therethrough from chamber 54, and for inhibiting gas from communicating inwardly therethrough and into chamber 54 from the atmosphere, further details of which will be discussed as the detailed description ensues. Consistent with the ensuing discussion, and depending upon the needs of the user, breather intake assembly 31 may be alternatively coupled in gas communication to inlet 61. In this regard, plug 63 may be alternatively threadably and detachably engaged to inlet 60 for inhibiting gas from communicating outwardly therethrough from chamber 54, and for inhibiting gas from communicating inwardly therethrough and into chamber 54 from the atmosphere, further details of which will also be discussed as the detailed description ensues.

With continuing reference to FIG. 4, chamber 54 of manifold 30 communicates and extends rearwardly through body 35 toward rearward end 40 and terminates with a temperature-sensitive relief valve 70 directed toward lower surface 37 of body 35. Temperature-sensitive relief valve 70 is not an essential feature of the present invention and may be incorporated in combination with the present invention at the option of the user. Furthermore, temperature-sensitive relief valve 70 is typical of known fusible emergency relief plug valves which melt and open at a predetermined temperature to vent pressure from container 21 thereby preventing container 21 from rupturing in the event of fire. In light of the foregoing, further and more specific details of temperature-sensitive relief valve 70 not herein specifically addressed will readily occur to the skilled artisan.

Other non-essential features of the present invention include a pressure-sensitive relief valve 71 and a pressure gauge 72. As shown in FIG. 1 and FIG. 4, pressure-sensitive relief valve 71 is mounted to body 35 of manifold 30 proximate forward end 41 and extends outwardly from lower surface 37. Pressure-sensitive relief valve 71 communicates with chamber 54 and is typical of known burst valves which open at a predetermined pressure to vent pressure from container 21 thereby preventing container 21 from rupturing as a result of internal pressure build-up. As shown in FIG. 1, FIG. 3 and FIG. 4, pressure gauge 72 is mounted to body 35 of manifold 30 proximate forward end 41 and extends outwardly from upper surface 36. Pressure gauge 72 communicates with chamber 54 and is typical of known pressure gauges operative for indicating pressure levels. In this regard, pressure gauge 72 operates for indicating the internal pressure present within chamber 54. Furthermore, because manifold 30 couples to container 21 in gas communication with space 23, the pressure reading evidenced by pressure gauge 72 corresponds not only to the pressure present within chamber 54, but also to the pressure present within space 23 of container 21. In light of the foregoing, further and more specific details of pressure-sensitive relief valve 71 and pressure gauge 72 not herein specifically addressed will readily occur to those having ordinary skill.

With continuing reference to FIG. 4, inlet 60 extends inwardly into channel 54 from forward end 41 and is defined by a threaded inner wall 75 operative for threadably and detachably engaging a threaded inner open end 76 of a valve 77 in gas communication upon rotation valve 77 in a predetermined and selected direction. Valve 77 is an optional feature of the present invention and further includes a outer open end 78 engagable to a connector 80 in gas communication upon rotation of connector 80 in a predetermined and selected direction. Connector is in turn engagable in gas communication to breather intake assembly 31, further details of which will now be presently discussed.

Breather intake assembly 31, connector 80 and valve 77 are engagable in series in to manifold 30 in gas communication for facilitating the passage of ambient air from the atmosphere and into space 23 of container 21. With attention directed in relevant part to FIG. 5 and FIG. 7, connector 80 includes a continuous sidewall 85 having an open inner end 86, an open outer end 87 and a continuous inner surface 88 defining a bore 89 communicating therethrough from open inner end 86 to open outer end 87. Connector 80 further includes a first outwardly threaded portion 90 proximate open inner end 86 operative for threadably and detachably engaging outer open end 78 of valve 77, and alternatively threaded inner wall 75 of inlet 60, further details of which will be discussed shortly. Connector 80 still further includes a second outwardly threaded portion 91 proximate open outer end 87 operative for threadably and detachably engaging a threaded inner wall 92 of breather intake assembly 31 in gas communication. Although not an essential feature, connector 80 further includes a gripping flange 93 extending laterally outwardly from continuous sidewall 85 intermediate open inner end 86 and open outer end 87 which may be gripped by a tool such as a wrench or other like apparatus for allowing a user to more easily threadably rotate and tighten connector 80 to either valve 77 or inlet 60.

With continuing reference to FIG. 6 and FIG. 7, breather intake assembly 31 includes an inlet element 100 having a continuous sidewall 101 with an open inlet end 102, an open outlet end 103 defined in part by threaded inner wall 92, and a continuous inner surface 105 defining a bore 104 extending therethrough from open inlet end 102 to open outlet end 103. Bore 104 is comprised of a first bore section 110 disposed in gas communication with open inlet end 102, first bore section 110 including a first bore diameter. Regarding the preferred embodiment, open inlet end 102 of inlet element 100 includes a plurality of apertures 130 extending inwardly therethrough in gas communication with first bore section 110 operative for communicating ambient air from the atmosphere and into first bore section 110. Bore 104 further includes a second bore section 111 in gas communication with first bore section 110 and open outlet end 103, second bore section 111 including a second bore diameter. Also present is a seat 112 located intermediate first bore section 110 and second bore section 111. As can be seen from the foregoing drawings, the first bore section diameter is somewhat smaller than the second bore section diameter, although this is not essential.

Breather intake assembly 31 further includes a valve assembly 120 carried by second bore section 111. Valve assembly 120 includes a plug 121 positioned proximate seat 112 and a biasing element 122 having a first end 123 for bearing engagement with plug 121, and a second end 124 for bearing engagement against open outer end 87 of connector 80. In this manner, biasing element 122 operates to normally bear plug 121 against seat 112 in normal sealing engagement for inhibiting gas from passing from first bore section 110 to second bore section 111. Regarding the present embodiment, biasing element 122 is preferably comprised of a conventional compression spring, although other suitable biasing means may be used without departing from the nature and scope of the present invention as herein specifically described.

In operation, breather intake assembly 31 admits ambient air from the atmosphere and therethrough for receipt into space 23 of container 21 when subatmospheric pressure is present within space 23 of container 21 for the purpose of relieving the subatmospheric pressure within space 23. In this regard, when subatmospheric pressure is present within chamber 23 of container 21, the bias of biasing element 122 becomes overcome or compromised to release plug 121 from its normal sealing engagement to seat 112 thus opening valve assembly 120 to permit ambient air to pass through apertures 130 of open inlet end 102, into first bore section 110 and thereby seat 112 for receipt into second bore section 111. From second bore section 111, the ambient air passes through open outlet end 103 for receipt into bore 89 of connector 80 through open outer end 87 thereof. The ambient air then passes through bore 89, through open inner end 86 of connector 80, into valve 77 through outer open end 78, inwardly from valve 77 through threaded inner end 76 and into chamber 54 of manifold 30 through inlet 60. From chamber 54, the ambient air passes by the bunghole through outlet 49 for receipt into space 23. Valve assembly 120 will remain open until the subatmospheric pressure within space 23 of container 21 subsides, after which valve assembly 120 will close. In the closed position, the biasing element 122 will bear plug 121 against seat 112 in sealing engagement thereby inhibiting ambient air from passing by seat 112 and into second bore section 111.

Consistent with the teachings of the present invention, valve assembly 120 is one-way and only permits the passage of ambient air from the atmosphere into space 23. In this regard, gas from space 23 is not allowed to pass through breather intake assembly 31 and outwardly into the atmosphere when the pressure within space 23 is superatmospheric or greater than the atmospheric pressure.

Because the ambient air in the atmosphere carries contaminants, passage of the ambient air through vent 20 and into space can result in contaminants entering space 23 thereby resulting in contamination of the contents contained within space 23. As shown in FIG. 5 and FIG. 7, to eliminate this contamination the instant invention may be provided with a filter generally designated by the reference character 135. Filter 135, also shown in FIG. 1, FIG. 4, FIG. 5, FIG. 9 and FIG. 10, includes a continuous sidewall 136, a closed lower end 137 and an open upper end 138 communicating with a chamber 139 enclosed by closed lower end 137 and continuous sidewall 136. Preferably constructed of a suitable filtering substance such as a selected foam or other like substance, filter 135 may be mounted upon open inlet end 102 via insertion of open inlet end 102 into chamber 139 for receipt against closed lower end 137 with continuous sidewall 136 enclosing or covering apertures 130. Filter 135 is constructed of a predetermined and selected size so that upon insertion of open inlet end 102 into chamber 139, continuous sidewall 136 will grippingly and detachably engage continuous sidewall 101 of inlet element 100. In this manner, as ambient air passes into breather intake assembly 31 through apertures 130, it must first pass through filter 135. As a result, filter 135 filters and removes the contaminant from the ambient air prior to being admitted through apertures 130, thus inhibiting contamination of the fluid housed within space 23 of container 21.

As herein previously mentioned, valve 77 is an optional feature of the present invention. In this regard, valve 77 is of the manual variety well known to those having ordinary skill. As shown in FIG. 1, FIG. 3 and FIG. 4, valve 77 includes a handle 150 that a user may grip and turn or actuate for either closing valve 77 thereby interrupting the passage of ambient air therethrough, or opening valve 77 thereby permitting ambient air to pass therethrough. Because valve 77 is conventional and an optional non-essential feature of the present invention, further details of valve 77 will not be herein further discussed as they will readily occur to the skilled artisan.

Consistent with the foregoing description, breather intake assembly 31 may be engaged in gas communication with not only inlet 60 in the first orientation as shown in FIGS. 1–4 and FIG. 8, but also inlet 61 in the second orientation as shown in FIGS. 8–9. Regarding the first orientation illustrated in FIG. 8, container 21 is shown positioned end to end upon a surface with vent 20 coupled to a bunghole located at one of the ends. Manifold 30 extends outwardly from the bunghole with forward end 41 directed upwardly therefrom. Breather intake assembly 31 is shown mounted to inlet 60 (not shown) relative forward end 41 in gas communication and extending upwardly therefrom superjacent container 21. In this manner of assembly, breather assembly 31 may operate to selectively admit ambient air into space 23 in the manner previously described without risk of the contents of container 23 admitting into breather intake assembly 31 which would otherwise inhibit breather intake assembly from operating properly. Although breather assembly 31 need not necessarily be positioned superjacent container 21, it is important for it to be located superjacent the level of fluid carried by container 21 so that the fluid may not flow into breather intake assembly 31.

Regarding the second orientation shown in FIG. 9, container 21 is generally shown positioned in an upright position with vent coupled to a bunghole. In this manner, manifold 30 extends upwardly from the bunghole with the breather intake assembly 31 mounted to inlet 61 in gas communication and extending upwardly therefrom superjacent container 21 with plug 63 threadably and detachably engaged to threaded inner wall 75 thereby plugging inlet 60. It will be readily understood that plug 63 is sized for threadably and detachably engaging not only inlet 61, but also inlet 60 for the purpose of facilitating convenience for the user, although this is not essential and more than admit ambient air through inlet 61 and into space 23 in the manner previously described without risk of the fluid contained within space 23 of container 21 admitting into breather intake assembly 31 which would otherwise inhibit breather intake assembly from operating properly. Although not herein discussed, the several reference characters corresponding to the various structural elements of vent 20 are depicted in FIG. 9 for the purpose of clarity, and correspond to the prior detailed description in combination with FIG. 4.

Consistent with the foregoing discussion, inlets 60 and 61 accommodate the useful and beneficial provision of alternate placement of breather intake assembly 31 in order to advantageously accommodate the needs of the user. Although only two alternate inlets have been disclosed in combination with manifold 30, more may be used consistent with the present teachings and suitable for allowing a user to enjoy additional convenience with the placement of breather intake assembly 31. In this regard, a plurality of plugs having structural and functional characteristics like plug 63 may also be provided so that a user may easily plug those inlets not engaged to the breather intake assembly 31.

As generally illustrated in FIG. 1, FIG. 8 and FIG. 10, lower surface 37 of manifold 30 faces container 21 when engaged to the bunghole. In the event temperature-sensitive valve 70 and pressure-sensitive valve 71 open, gas or fluid emerging therefrom is directed toward shell 22 of container 21 and away from users that may be present near vent 20. As a result, gas or fluid emerging from the temperature-sensitive valve 70 and the pressure-sensitive valve 71 will be prevented from spraying or splattering upon users that may be near valve 20. This feature is particularly advantageous for inhibiting personal injury in those instances when perhaps the gas or fluid emerging from the temperature-sensitive valve 70 and the pressure-sensitive valve 71 is toxic.

Although the various elements of vent 20 have been disclosed as threadably and detachably engageable to one another, other suitable means of detachable engagement may otherwise be used consistent with the teachings herein without departing from the nature and scope of the present invention as herein specifically described. Furthermore, to increase to functional utility of vent 20, the various elements of vent 20 disclosed herein are not only detachably engagable to one another, but may also be sealingly engagable for inhibiting gas leaks from occurring at vent 20, although this is not essential.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

I claim:

1. In combination with a container of a type including a shell enclosing a space and a bunghole formed through the shell to access the space, a vent for conducting gas from the atmosphere to the space, said vent comprising:

a manifold including an inlet, an outlet detachably engagable to the bunghole in gas communication, and a channel interconnecting said inlet and said outlet in gas communication;

a breather intake assembly including,
      an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and
      a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to said inlet of said manifold in gas communication;

said valve assembly movable from the closed position to the open position when sub-atmospheric pressure is present within the space of the container.

2. The vent of claim 1, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

3. The vent of claim 1, wherein said biasing means includes a compression spring having a first end in bearing engagement with said connector means and a second end in bearing engagement with said plug.

4. The vent of claim 1, further including a pressure-sensitive valve carried by said manifold in gas communication with said channel and directed toward said container, said burst valve being operative to release gas from said space when superatmospheric pressure is present within the space of the container.

5. The vent of claim 1, further including a filter carried by said open inlet end of said breather intake assembly and operative for filtering contaminants from the gas passing into said open inlet end of said breather intake assembly to inhibit contaminants from entering the space of the container.

6. The vent of claim 1, further including a temperature-sensitive valve carried by said manifold in gas communication with said channel and directed toward said container, said temperature-sensitive valve being operative to release gas from said space at a predetermined temperature.

7. In combination with a container of a type including a shell enclosing a space and a bunghole formed through the shell to access the space, a vent for conducting gas from the atmosphere to the space, said vent comprising:

a manifold including an inlet, an outlet detachably engagable to the bunghole in gas communication, and a channel interconnecting said inlet and said outlet in gas communication;

a breather intake assembly including,
      an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and
      a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to said inlet of said manifold in gas communication;

a filter carried by said open inlet end of said breather intake assembly;

said valve assembly movable from the closed position to the open position when sub-atmospheric pressure is present within the space of the container.

8. The vent of claim 7, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

9. The vent of claim 7, wherein said biasing means includes a compression spring having a first end in bearing engagement with said connector means and a second end in bearing engagement with said plug.

10. The vent of claim 7, further including a pressure-sensitive valve carried by said manifold in gas communication with said channel and directed toward said container, said pressure-sensitive valve being operative to release gas from said space when superatmospheric pressure is present within the space of the container.

11. The vent of claim 7, further including a temperature-sensitive valve carried by said manifold in gas communication with said channel and directed toward said container, said temperature-sensitive valve being operative to release gas from said space at a predetermined temperature.

12. In combination with a container of a type including a shell enclosing a space and a bunghole formed through the shell to access the space, a vent for conducting gas from the atmosphere to the space, said vent comprising:

a manifold including a plurality of inlets, an outlet detachably engagable to the bunghole in gas communication and a channel interconnecting said outlet and said plurality of inlets in gas communication;

a breather intake assembly including, an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to a selected one of said plurality of inlets of said manifold in gas communication;

means for plugging the other of said plurality of inlets for preventing gas from passing therethrough to and from said manifold when not engaged to said breather intake assembly;

said valve assembly movable from the closed position to the open position when sub-atmospheric pressure is present within the space of the container.

13. The vent of claim 12, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

14. The vent of claim 12, wherein said biasing means includes a compression spring having a first end in bearing engagement with said connector means and a second end in bearing engagement with said plug of said valve assembly.

15. The vent of claim 12, further including a pressure-sensitive valve carried by said manifold in gas communication with said channel and directed toward said container, said pressure-sensitive valve being operative to release gas from said space when superatmospheric pressure is present within the space of the container.

16. The vent of claim 12, further including a temperature-sensitive valve carried by said manifold in gas communication with said channel and directed toward said container, said temperature-sensitive valve being operative to release gas from said space at a predetermined temperature.

17. The vent of claim 12, further including a filter carried by said open inlet end of said breather intake assembly and operative for filtering contaminants from the gas passing into said open inlet end of said breather intake assembly to inhibit contaminants from entering the space of the container.

18. In combination with a container of a type including a shell enclosing a space and a bunghole formed through the shell to access the space, a vent for conducting gas from the atmosphere to the space, said vent comprising:

a manifold including a first inlet, a second inlet, an outlet detachably engagable to the bunghole in gas communication and a channel interconnecting said outlet, said first inlet and said second inlet in gas communication;

a breather intake assembly including, an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to one of said first inlet of said manifold and said second inlet of said manifold in gas communication;

a plug sealingly engagable with the other of said first inlet and said second inlet for preventing gas from passing therethrough to and from said manifold through the other of said first inlet and said second inlet when not engaged to the breather intake assembly;

said valve assembly movable from the closed position to the open position when sub-atmospheric pressure is present within the space of the container.

19. The vent of claim 18, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

20. The vent of claim 18, wherein said biasing means includes a compression spring having a first end in bearing engagement with said connector means and a second end in bearing engagement with said plug of said valve assembly.

21. The vent of claim 18, wherein said connector means includes a connector having a continuous sidewall with an open outer end engagable to said open outlet end of said breather intake assembly in gas communication, and an open inner end engagable to said inlet of said manifold in gas communication, and a connector bore extending therethrough from said open outer end to said open inner end for facilitating the passage of gas from said open outlet end of said breather intake assembly to said inlet of said manifold.

22. The vent of claim 18, further including a pressure-sensitive valve carried by said manifold in gas communication with said channel and directed toward said container, said pressure-sensitive valve being operative to release gas from said space when superatmospheric pressure is present within the space of the container.

23. The vent of claim 18, further including a temperature-sensitive valve carried by said manifold in gas communication with said channel and directed toward said container, said temperature-sensitive valve being operative to release gas from said space at a predetermined temperature.

24. The vent of claim 18, further including a filter carried by said open inlet end of said breather intake assembly and operative for filtering contaminants from the gas passing into said open inlet end of said breather intake assembly to inhibit contaminants from entering the space of the container.

25. In combination with a container of a type including a shell enclosing a space and a bunghole formed through the shell to access the space, a vent for conducting gas from the atmosphere to the space, said vent comprising:

a manifold including an inlet, an outlet detachably engagable to the bunghole in gas communication, and a channel interconnecting said inlet and said outlet in gas communication;

a breather intake assembly including,
an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to said inlet of said manifold in gas communication;

said valve assembly movable from the closed position to the open position when sub-atmospheric pressure is present within the space of the container; and a pressure-sensitive valve carried by said manifold in gas communication with said channel and directed toward said container, said pressure-sensitive valve being operative to release gas from said space when super-atmospheric pressure is present within the space of the container.

26. The vent of claim 25, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

27. The vent of claim 25, wherein said biasing means includes a compression spring having a first end in bearing engagement with said connector means and a second end in bearing engagement with said plug of said valve assembly.

28. The vent of claim 25, further including a filter carried by said open inlet end of said breather intake assembly and operative for filtering contaminants from the gas passing into said open inlet end of said breather intake assembly to inhibit contaminants from entering the space of the container.

29. In combination with a container of a type including a shell enclosing a space and a bunghole formed through the shell to access the space, a vent for conducting gas from the atmosphere to the space, said vent comprising:

a manifold including an inlet, an outlet detachably engagable to the bunghole in gas communication, and a channel interconnecting said inlet and said outlet in gas communication;

a breather intake assembly including,
an inlet element having a continuous sidewall with an open inlet end, an open outlet end, a bore extending therethrough from said open inlet end to said open outlet end for facilitating the passage of gas from said open inlet end to said open outlet end, said bore including a first bore section in gas communication with said open inlet end, a second bore section in gas communication with said first bore section and said open outlet end, and a seat located intermediate said first bore section and said second bore section, and a valve assembly carried by said second bore section and movable between a normal closed position for inhibiting gas from passing from said first bore section to said second bore section, and an open position for allowing gas to pass from said first bore section to said second bore section;

connector means for interconnecting said open outlet end of said breather intake assembly to said inlet of said manifold in gas communication;

said valve assembly movable from the closed position to the open position when sub-atmospheric pressure is present within the space of the container; and a temperature-sensitive valve carried by said manifold in gas communication with said channel and directed toward said container, said temperature-sensitive valve being operative to release gas from said space at a predetermined temperature.

30. The vent of claim 29, wherein said valve assembly includes:

a plug positioned proximate said seat; and biasing means for bearing said plug against said seat in normal sealing engagement for inhibiting gas from passing from said first bore section to said second bore section, the bias of said biasing means being overcome to release said plug from said seat to permit gas to admit thereby and into said second bore section, through said connector, said inlet, said channel and said outlet of said manifold for receipt into the space of the container when sub-atmospheric pressure is present within the space of the container.

31. The vent of claim 29, wherein said biasing means includes a compression spring having a first end in bearing engagement with said connector means and a second end in bearing engagement with said plug of said valve assembly.

32. The vent of claim 29, further including a filter carried by said open inlet end of said breather intake assembly and operative for filtering contaminants from the gas passing into said open inlet end of said breather intake assembly to inhibit contaminants from entering the space of the container.

* * * * *